United States Patent
Andrivon et al.

(10) Patent No.: US 11,277,643 B2
(45) Date of Patent: Mar. 15, 2022

(54) METHOD AND DEVICE FOR RECONSTRUCTING IMAGE DATA FROM DECODED IMAGE DATA

(71) Applicant: INTERDIGITAL VC HOLDINGS, INC., Wilmington, DE (US)

(72) Inventors: Pierre Andrivon, Liffre (FR); David Touze, Rennes (FR); Nicolas Caramelli, Rennes (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 128 days.

(21) Appl. No.: 15/868,111

(22) Filed: Jan. 11, 2018

(65) Prior Publication Data
US 2018/0249182 A1    Aug. 30, 2018

(51) Int. Cl.
*H04N 19/65* (2014.01)
*H04N 19/44* (2014.01)
*H04N 19/70* (2014.01)

(52) U.S. Cl.
CPC ............ *H04N 19/65* (2014.11); *H04N 19/44* (2014.11); *H04N 19/70* (2014.11)

(58) Field of Classification Search
CPC ......... H04N 19/65; H04N 19/44; H04N 19/70
(Continued)

(56) References Cited

U.S. PATENT DOCUMENTS 5,856,973 A * 1/1999 Thompson .............. G06T 9/007
348/461

2008/0019565 A1 * 1/2008 Steinberg ................. G06K 9/36
382/103
(Continued)

FOREIGN PATENT DOCUMENTS

CN          106233706         12/2016
EP          2866450           4/2015
(Continued)

OTHER PUBLICATIONS

Anonymous, "High-Performance Single Layer High Dynamic Range (HDR) System for use in Consumer Electronics devices; Part 1: Directly Standard Dynamic Range (SDR) Compatible HDR System (SL-HDR1)", European Telecommunications Standards Institute, Standard ETSI TS 103 433-1 V1.2.1, Aug. 2017, pp. 1-123.
(Continued)

*Primary Examiner* — Mark Roz
(74) *Attorney, Agent, or Firm* — Invention Mine LLC

(57) ABSTRACT

A method or device for reconstructing image data representative of original image data from decoded image data and parameters obtained from a bitstream is described. The parameters having been processed from the original image data. The method includes checking if parameters are lost, corrupted or not aligned with the decoded image data whose graphics or overlay is added to, when at least one of the parameters is lost, corrupted or not aligned with the decoded image data whose graphics or overlay is added to; selecting a recovery mode according to an information data indicating how the parameters have been processed; and recovering the at least one lost, corrupted or not aligned parameter by applying the selected recovery mode, the reconstruction of image data then taking also into account the recovered parameters.

11 Claims, 8 Drawing Sheets

(58) Field of Classification Search
USPC .......................................................... 382/233
See application file for complete search history.

(56) References Cited

U.S. PATENT DOCUMENTS

| | | | |
|---|---|---|---|
| 2009/0207191 A1* | 8/2009 | Zarubinsky | H04N 5/202 345/690 |
| 2012/0099794 A1* | 4/2012 | Peeters | G06T 3/0012 382/190 |
| 2013/0222542 A1 | 8/2013 | Tsukagoshi | |
| 2013/0250052 A1 | 9/2013 | Suh et al. | |
| 2015/0189298 A1 | 7/2015 | Ye et al. | |
| 2015/0245050 A1 | 8/2015 | Tourapis et al. | |
| 2015/0264345 A1* | 9/2015 | Cohen | H04N 19/50 375/240.12 |
| 2017/0103497 A1 | 4/2017 | Cao et al. | |
| 2017/0287433 A1* | 10/2017 | Majid | G09G 5/003 |
| 2020/0394774 A1 | 12/2020 | Andrivon et al. | |

FOREIGN PATENT DOCUMENTS

| | | |
|---|---|---|
| EP | 3217664 B1 | 6/2020 |
| RU | 2571550 C2 | 12/2015 |
| WO | WO2010151555 | 12/2010 |
| WO | 2011129084 A1 | 10/2011 |
| WO | WO2014161109 | 10/2014 |
| WO | WO2015180854 | 12/2015 |
| WO | WO2015196456 | 12/2015 |

OTHER PUBLICATIONS

Anonymous, "Reference software for ITU-T H.265 high efficiency video coding", International Telecommunication Union Standard, ITU-T H.265.2, Series H: Audiovisual and Multimedia Systems, Infrastructure of audiovisual services—Coding of moving video, Oct. 2014, pp. 1-12.

Anonymous, "High Dynamic Range Electro-Optical Transfer Function of Mastering Reference Displays", Society of Motion Picture and Television Engineers Standard, SMPTE Standard SMPTE ST 2084:2014, Aug. 16, 2014, pp. 1-14.

Diaz et al., "Integrating HEVC Video Compression with a High Dynamic Range Video Pipeline", SMPTE Motion Imaging Journal, vol. 125, No. 1, Jan./Feb. 2016, pp. 14-21.

Anonymous, "Advanced video coding for generic audiovisual services", International Telecommunication Union Standard, ITU-T H.264, Series H: Audiovisual and Multimedia Systems, Infrastructure of audiovisual services—coding of moving video, Jan. 2012, pp. 1-680.

ST2086, S. M. P. T. E. "Mastering Display Color Volume Metadata Supporting High Luminance and Wide Color Gamut Images." the Society of Motion Picture and Television Engineers Journal (2014).

Recommendation ITU-R BT.2020-2 (Oct. 2015) "Parameter values for ultra-high definition television systems for production and international programme exchange" Oct. 2015 / Jan. 10, 2015.

Standard, SMPTE "Dynamic Metadata for Color Volume Transform—Application #3" SMPTE ST 2094-30:2016 (16 pages) 2016.

Standard, SMPTE "Dynamic Metadata for Color Volume Transform—Application #2" SMPTE ST 2094-20:2016 (23 pages) 2016.

Standard, SMPTE "Dynamic Metadata for Color Volume Transform—Core Components" SMPTE ST 2094-1:2016 (15 pages) 2016.

CEA Standard "HDR Static Metadata Extensions." CEA-861.3, January (2015).

Anonymous, "High-Performance Single Layer Directly Standard Dynamic Range (SDR) Compatible High Dynamic Range (HDR) System for use in Consumer Electronics devices (SL-HDR1)", European Telecommunications Standards nstitute, Technical Specification, ETSI TS 103 433 v1.1.1, Aug. 2016, pp. 1-84.

Recommendation ITU-R BT 709-6 (Jun. 2015); "Parameter values for the HDTV standards for production and International programme exchange" Jun. 2015 / Jan. 6, 2015.

Recommendation ITU-R BT 2100-0, "Image parameter values for high dynamic range television for use in production and international program exchange"; Jul. 2016 / Jan. 7, 2016.

De Haan, W. et al./"Indication of SMPTE 2094-20 metadata in HEVC" Joint Collaborative Team on Video Coding (JCT-VC) of ITU-T SG 16 WP 3 and ISO/IEC JTC 1/SC 29/WG 11; 23rd Meeting: San Diego, USA, Feb. 19-26, 2016/Feb. 2016.

\* cited by examiner

METHOD AND DEVICE FOR RECONSTRUCTING IMAGE DATA FROM DECODED IMAGE DATA

1. REFERENCE TO RELATED EUROPEAN APPLICATIONS

This application claims priority from European Patent Application No. 17305212.7 entitled "METHOD AND DEVICE FOR RECONSTRUCTING IMAGE DATA FROM DECODED IMAGE DATA", filed on Feb. 24, 2017; European Patent Application No. 17158481.6, entitled "METHOD AND DEVICE FOR RECONSTRUCTING IMAGE DATA FROM DECODED IMAGE DATA", filed on Feb. 28, 2017; and Japanese Patent Application No. 2017-239281, entitled "METHOD AND DEVICE FOR RECONSTRUCTING IMAGE DATA FROM DECODED IMAGE DATA", filed on Dec. 14, 2017, the contents of which are hereby incorporated by reference in their entirety.

2. FIELD

The present principles generally relate to image/video reconstruction from decoded image/video data. Particularly, but not exclusively, the technical field of the present principles is related to recovering parameters for reconstructing an image from another image.

3. BACKGROUND

The present section is intended to introduce the reader to various aspects of art, which may be related to various aspects of the present principles that are described and/or claimed below. This discussion is believed to be helpful in providing the reader with background information to facilitate a better understanding of the various aspects of the present principles. Accordingly, it should be understood that these statements are to be read in this light, and not as admissions of prior art.

In the following, image data refer to one or several arrays of samples (pixel values) in a specific image/video format which specifies all information relative to the pixel values of an image (or a video) and all information which may be used by a display and/or any other device to visualize and/or decode a image (or video) for example. An image comprises a first component, in the shape of a first array of samples, usually representative of luminance (or luma) of the image, and a second and third component, in the shape of other arrays of samples, usually representative of the color (or chroma) of the image. Or, equivalently, the same information may also be represented by a set of arrays of color samples, such as the traditional tri-chromatic RGB representation.

A pixel value is represented by a vector of C values, where C is the number of components. Each value of a vector is represented with a number of bits which defines a maximal dynamic range of the pixel values.

Standard-Dynamic-Range images (SDR images) are images whose luminance values are represented with a limited number of bits (typically 8). This limited representation does not allow correct rendering of small signal variations, in particular in dark and bright luminance ranges. In high-dynamic range images (HDR images), the signal representation is extended to maintain a high accuracy of the signal over its entire range. In HDR images, pixel values representing luminance levels are usually represented in floating-point format (typically at least 10 bits per component, namely float or half-float), the most popular format being openEXR half-float format (16-bit per RGB component, i.e. 48 bits per pixel) or in integers with a long representation, typically at least 16 bits.

The arrival of the High Efficiency Video Coding (HEVC) standard (ITU-T H.265 Telecommunication standardization sector of ITU (10/2014), series H: audiovisual and multimedia systems, infrastructure of audiovisual services—coding of moving video, High efficiency video coding, Recommendation ITU-T H.265) enables the deployment of new video services with enhanced viewing experience, such as Ultra HD broadcast services. In addition to an increased spatial resolution, Ultra HD can bring a wider color gamut (WCG) and a higher dynamic range (HDR) than the Standard dynamic range (SDR) HD-TV currently deployed. Different solutions for the representation and coding of HDR/WCG video have been proposed (SMPTE 2014, "High Dynamic Range Electro-Optical Transfer Function of Mastering Reference Displays, or SMPTE ST 2084, 2014, or Diaz, R., Blinstein, S. and Qu, S. "Integrating HEVC Video Compression with a High Dynamic Range Video Pipeline", SMPTE Motion Imaging Journal, Vol. 125, Issue 1, Feb. 2016, pp 14-21).

SDR backward compatibility with decoding and rendering devices is an important feature in some video distribution systems, such as broadcasting or multicasting systems.

A solution based on a single layer coding/decoding process may be backward compatible, e.g. SDR compatible, and may leverage legacy distribution networks and services already in place.

Such a single layer based distribution solution enables both high quality HDR rendering on HDR-enabled Consumer Electronic (CE) devices, while also offering high quality SDR rendering on SDR-enabled CE devices.

Such a single layer based distribution solution generates an encoded signal, e.g. SDR signal, and associated metadata (of a few bytes per video frame or scene) that can be used to reconstruct another signal, e.g. HDR signal, from a decoded signal, e.g. SDR signal.

Metadata stored parameters values used for the reconstruction of the signal and may be static or dynamic. Static metadata means metadata that remains the same for a video (set of images) and/or a program.

Static metadata are valid for the whole video content (scene, movie, clip . . . ) and may not depend on the image content. They may define, for example, image format or color space, color gamut. For instance, SMPTE ST 2086:2014, "Mastering Display Color Volume Metadata Supporting High Luminance and Wide Color Gamut Images" is such a kind of static metadata for use in production environment. The Mastering Display Colour Volume (MDCV) SEI (Supplemental Enhanced Information) message is the distribution flavor of ST 2086 for both H.264/AVC ("Advanced video coding for generic audiovisual Services", SERIES H: AUDIOVISUAL AND MULTIMEDIA SYSTEMS, Recommendation ITU-T H.264, Telecommunication Standardization Sector of ITU, January 2012) and HEVC video codecs.

Dynamic metadata are content-dependent, that is metadata can change with the image/video content, e.g. for each image or when each group of images. As an example, SMPTE ST 2094:2016 standards families, "Dynamic Metadata for Color Volume Transform" are dynamic metadata for use in production environment. SMPTE ST 2094-30 can be distributed along HEVC coded video stream thanks to the Color Remapping Information (CRI) SEI message.

Other single layer based distribution solutions exist on distribution networks for which display adaptation dynamic metadata are delivered along with a legacy video signal. These single layer based distribution solutions may produce HDR 10-bits image data (e.g. image data which signal is represented as an HLG10 or PQ10 signal as specified in Rec. ITU-R BT.2100-0 "Recommendation ITU-R BT.2100-0, Image parameter values for high dynamic range television for use in production and international program exchange") and associated metadata from an input signal (typically 12 or 16 bits), encodes said HDR 10-bits image data using, for example an HEVC Main 10 profile encoding scheme, and reconstructs a video signal from a decoded video signal and said associated metadata. The dynamic range of the reconstructed signal being adapted according to the associated metadata that may depend on characteristics of a target display.

Dynamic metadata transmission in actual real-world production and distribution facilities were hard to guarantee and could be possibly lost or corrupted because of splicing, overlay layers insertion, professional equipment pruning bitstream, stream handling by affiliates and current lack of standardization for the carriage of metadata throughout the post-production/professional plant.

The single layer based distribution solutions cannot work without the presence of different bunch of dynamic metadata with some of them being critical for guaranteeing the success of the reconstruction of the video signal.

Similar issues may also occur when dynamic metadata are not aligned with an image whose graphics or overlay is added to. This occurs, for example, when graphics (overlays, OSD, . . . ) are inserted in (added to) an image outside the distribution chain because the metadata, computed for said image, is also applied once the graphics are inserted in (added to) the image. The metadata are then considered as being not aligned with the image whose graphics or overlay are added to because they may not be adapted to the part of said image which contains graphics or overlay.

These issues might be characterized by image flickering on fixed portion of graphics when the decoded image is displayed over time or by undesirable effects (saturation, clipping . . . ) on portion of the image containing graphics or overlay processed with inappropriate metadata (e.g. bright OSD processed by metadata generated for a dark content).

4. SUMMARY

The following presents a simplified summary of the present principles in order to provide a basic understanding of some aspects of the present principles. This summary is not an extensive overview of the present principles. It is not intended to identify key or critical elements of the present principles. The following summary merely presents some aspects of the present principles in a simplified form as a prelude to the more detailed description provided below.

The present principles set out to remedy at least one of the drawbacks of the prior art with a method and a device for reconstructing image data representative of original image data from decoded image data and parameters obtained from a bitstream, said parameters having been processed from said original image data. The method comprises:

checking if said parameters are lost, corrupted or not aligned with the decoded image data whose graphics or overlay is added to;

when at least one of said parameters is lost, corrupted or not aligned with the decoded image data whose graphics or overlay is added to, selecting a recovery mode according to an information data indicating how said parameters have been processed; and recovering said at least one lost, corrupted or not aligned parameter by applying the selected recovery mode, said reconstruction of image data then taking also into account said recovered parameters.

According to an embodiment, the information data is explicitly signaled by a syntax element in a bitstream.

According to an embodiment, the information data (ID) is implicitly signaled.

According to an embodiment, the information data identifies what is the processing applied to the original image data to process the parameters.

According to an embodiment, a parameter is considered as being lost when it is not retrieved from a bitstream.

According to an embodiment, a parameter is considered as being corrupted when at least one of the following conditions is fulfilled:

its value is out of a range of values;

said parameter does not have a coherent value according to other parameter values.

According to an embodiment, a recovery mode is to replace all the parameters by recovered parameters even if only some of the parameters are not corrupted, lost or not aligned with the decoded image data whose graphics or overlay is added to.

According to an embodiment, a recovery mode is to replace each lost, corrupted or not aligned parameters by a recovered parameter. According to an embodiment, a recovery mode is to replace a lost, corrupted or not aligned parameter by a value of a set of pre-determined parameter values previously stored.

According to an embodiment, a recovery mode is selected according to either at least one characteristic of original image data, or of a mastering display used to grade the original image data or the image data to be reconstructed, or at least one characteristic of reconstructed image data or of a target display.

According to other of their aspects, the present principles also relate to a device comprising means for implementing the above method and a non-transitory processor-readable medium whose program code instructions to execute the steps of the above method when this program is executed on a computer.

5. BRIEF DESCRIPTION OF DRAWINGS

In the drawings, examples of the present principles are illustrated. It shows:

Similar or same elements are referenced with the same reference numbers.

6. DESCRIPTION OF EXAMPLE OF THE PRESENT PRINCIPLES

Figure 1:
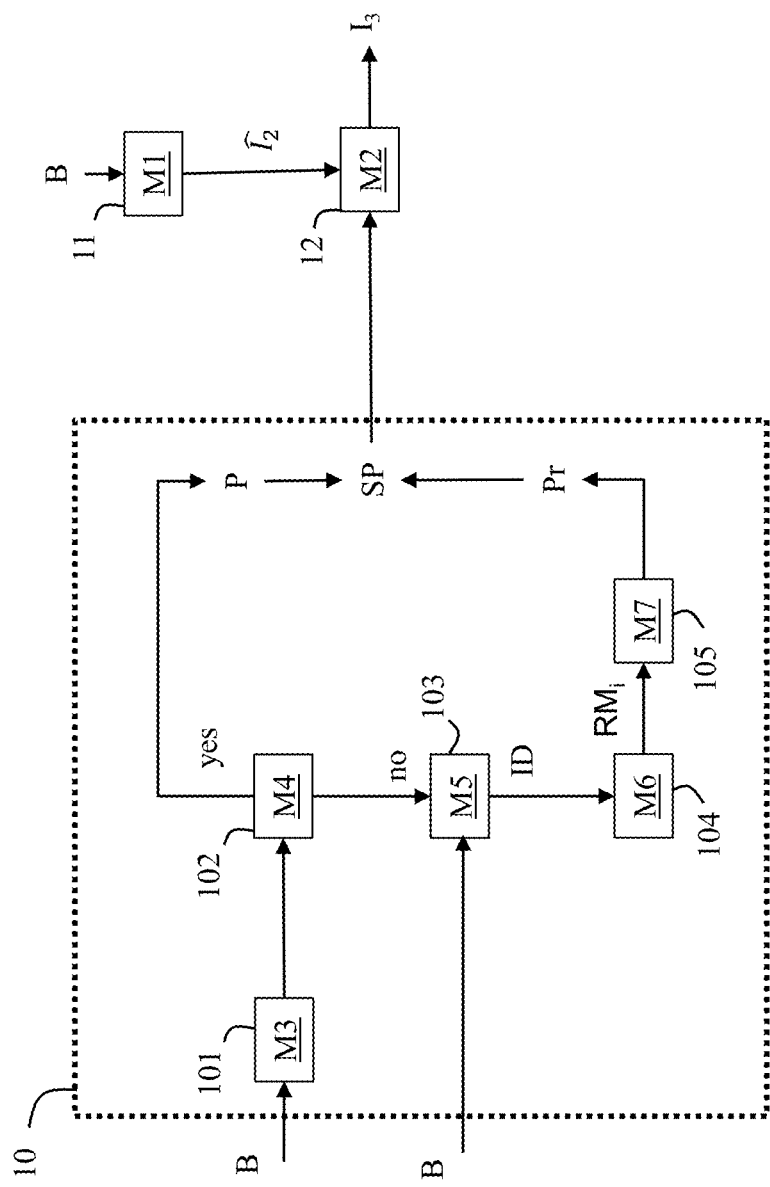
FIG. 1 shows a diagram of the steps of a method for reconstructing an image $I_3$ representative of original image $I_1$ from a decoded image $\hat{I}_2$ in accordance with an example of the present principles.

The present principles will be described more fully hereinafter with reference to the accompanying figures, in which examples of the present principles are shown. The present principles may, however, be embodied in many alternate forms and should not be construed as limited to the examples set forth herein. Accordingly, while the present principles are susceptible to various modifications and alternative forms, specific examples thereof are shown by way of examples in the drawings and will herein be described in detail. It should be understood, however, that there is no intent to limit the present principles to the particular forms disclosed, but on the contrary, the disclosure is to cover all modifications, equivalents, and alternatives falling within the spirit and scope of the present principles as defined by the claims.

The terminology used herein is for the purpose of describing particular examples only and is not intended to be limiting of the present principles. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the present principles.

Although some of the diagrams include arrows on communication paths to show a primary direction of communication, it is to be understood that communication may occur in the opposite direction to the depicted arrows.

Some examples are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "in accordance with an example" or "in an example" means that a particular feature, structure, or characteristic described in connection with the example can be included in at least one implementation of the present principles. The appearances of the phrase in accordance with an example" or "in an example" in various places in the specification are not necessarily all referring to the same example, nor are separate or alternative examples necessarily mutually exclusive of other examples.

Reference numerals appearing in the claims are by way of illustration only and shall have no limiting effect on the scope of the claims.

While not explicitly described, the present examples and variants may be employed in any combination or sub-combination.

In the following, the capital symbols, for example (C1, C2,C3), designate components of a first image, and lower-case symbols, for example (c1, c2, c3), designate components of another image whose dynamic range of the luminance is lower than the dynamic range of the luminance of the first image.

The dynamic range of the luminance of an image is the ratio between the maximum over the minimum of the luminance values of said image. Typically, the dynamic range of the luminance of a SDR image is 500 (100 cd/m2 over 0,2 cd/m2) and 10000 (1000 cd/m2 over 0,1 cd/m2) for an HDR image.

Prime symbols, in the following, for example $$\left(Y' = Y^{\frac{1}{\gamma}}, U' = U^{\frac{1}{\gamma}}, V' = V^{\frac{1}{\gamma}}\right),$$

designate gamma-compressed components of a first image when those prime symbols are capital symbols and prime symbols, for example (y', u', v'), designate gamma-compressed components of a second image when those prime symbols are lower-case symbols.

The present principles are described for coding/decoding/reconstructing an image but extends to the coding/decoding/reconstruction of a sequence of images (video) because each image of the sequence is sequentially encoded/decoded/reconstructed as described below.

FIG. 1 shows a diagram of the steps of a method for reconstructing an image $I_3$ representative of original image $I_1$ from a decoded image $\widehat{I_2}$ in accordance with an example of the present principles.

In step 10, a set of parameters SP is obtained to reconstruct the image $I_3$. These parameters are either parameters P obtained from the bitstream B, or recovered parameters $P_r$ when at least one parameter P is lost, corrupted or not aligned with a decoded image $\widehat{I_2}$ whose graphics or overlay is added to.

In step 11, a module M1 obtains the decoded image $\widehat{I_2}$ and in step 12, a module M2 reconstructs the image $I_3$ from the decoded image $\widehat{I_2}$ by using the set of parameters SP.

The decoded image data $\hat{I}_2$ is obtained from the bitstream (signal) B or any other bitstream and, possibly, said bitstreams may be stored on a local memory or any other storage medium.

In sub-step 101 (of step 10), a module M3 obtains the parameters P required to reconstruct the image $I_3$.

In sub-step 102 (of step 10), a module M4 checks if at least one of the parameters P is lost, corrupted or not aligned with the decoded image $\hat{I}_2$ whose graphics or overlay is added to.

When none of the parameter P is lost, corrupted, or not aligned with the decoded image $\hat{I}_2$ whose graphics or overlay is added to, the set of parameters SP only comprises the parameters P.

When at least one of the parameters P is either lost, corrupted or not aligned with the decoded image $\hat{I}_2$ whose graphics or overlay is added to, in sub-step 103 (of step 10), a module M5 obtains an information data ID indicating how said parameters have been processed, in sub-step 104 (of step 10), a module M6 selects a recovery mode $RM_i$ according to said information data ID, and in sub-step 105 (of step 10), a module M7 recovers said at least one lost, corrupted or not aligned parameter by applying the selected recovery mode $RM_i$. The at least one recovered parameter $P_r$ is added to the set of parameters SP.

In step 12, the image $I_3$ is then reconstructed taking also into account said at least one recovered parameter $P_r$.

The method is advantageous because it allows to obtain parameters for a single layer based distribution solution when multiple single layer based distribution solutions share a same set of syntax elements for carrying a common set of parameters and when said single layer based distribution solutions require different recovery modes (process) for recovering lost, corrupted or not aligned parameters, guaranteeing thus the success of the reconstruction of the image $I_3$ for each of said single layer based distribution solution.

The method is also advantageous when a CE device, typically a set-top-box or a player, inserts graphics on top of a decoded image $\hat{I}_2$, because the method selects a specific recovery mode to replace the not aligned parameters by parameters adapted to the decoded image $I_2$ plus the graphics (or overlay) and reconstructs the image $I_3$ by using said recovered parameters from said decoded image $\hat{I}_2$ whose graphics or overlay is added to, avoiding thus some flickering artefacts or undesired effects impacting the reconstructed image quality.

The method as described in reference with FIG. 1 may be used in various applications when an image must be reconstructed from a decoded image.

Figure 2:
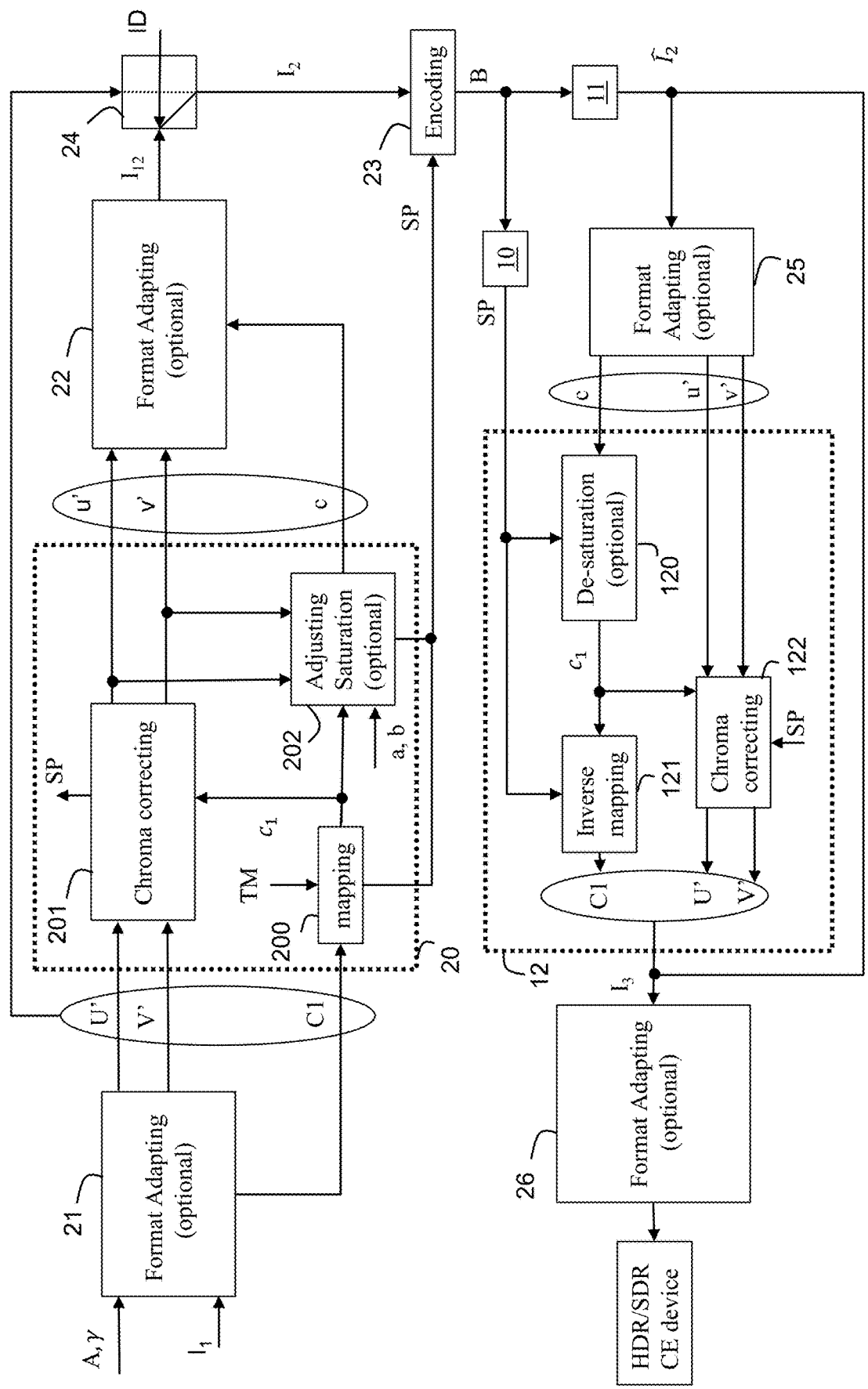
FIG. 2 shows an end-to-end workflow supporting content production and delivery to HDR and SDR enabled CE displays in accordance with an example of the present principles.

FIG. 2 shows an end-to-end workflow supporting content production and delivery to HDR and SDR enabled CE displays in accordance with an example of the present principles.

This workflow involves a single layer based distribution solution with associated metadata and illustrates an example of the use of a method for reconstructing an image $I_3$ representative of original image data $I_1$ from a decoded image data $\hat{I}_2$ and a set of parameters SP obtained in accordance with an example of the present principles illustrated in FIG. 1.

Basically, this single layer based distribution solution comprises a pre-processing part and a post-processing part.

At the pre-processing part, a pre-processing stage 20 decomposes the original image $I_1$ in an output image 112 and a set of parameters SP, and a switching step 24 determines if either the original image $I_1$ or the output image 112 is encoded in the bitstream B (step 23).

In step 23, the image $I_2$ may be encoded with any legacy video codec and the bitstream B is carried throughout an existing legacy distribution network with accompanying associated metadata (set of parameters SP) conveyed on a specific channel or embedded in the bitstream B.

In a variant, the bitstream B with accompanying metadata are stored on a storage medium such a Blu-ray disk or a memory or a register of a Set-Top-Box for example.

In a variant, the accompanying associated metadata is carried by another specific channel or store on a separate storage medium.

Preferably, the video is coded with H.265/HEVC codec (ITU-T H.265 Telecommunication standardization sector of ITU (10/2014), series H: audiovisual and multimedia systems, infrastructure of audiovisual services—coding of moving video, High efficiency video coding, Recommendation ITU-T H.265) or H.264/AVC ("Advanced video coding for generic audiovisual Services", SERIES H: AUDIOVISUAL AND MULTIMEDIA SYSTEMS, Recommendation ITU-T H.264, Telecommunication Standardization Sector of ITU, January 2012).

In the case the information data ID determines that the original image $I_1$ (possibly represented by the components (C1, U', V') or a Y'CbCr 4:2:0 PQ10 or HLG10 video signal) is encoded in step 23, said original image $I_1$ may be encoded with the HEVC Main 10 profile.

In the case the information data ID determines that the output image $I_{12}$ is encoded in step 23, the output image $I_{12}$, which can be represented as a Y'CbCr 4:2:0 gamma transfer characteristics (Standard Dynamic Range) signal may be encoded with any HEVC profile including Main 10 or Main profiles.

The information data ID may be also conveyed as associated metadata (step 23). At the post-processing part, a decoded image $\hat{I}_2$ is obtained from the bitstream B (step 11), a set of parameters SP is obtained as explained in FIG. 1 (step 10) and a post-processing stage 12, which is the functional inverse of the pre-processing stage 20, reconstructs an image $I_3$ from the decoded image $\hat{I}_2$ and the set of parameters SP.

This single layer based distribution solution may also comprise optional format adapting steps 21, 22, 25, 26.

For example, in step 21 (optional), the format of the original image $I_1$ may be adapted to a specific format (C1, U', V') of the input of the pre-processing stage 20, and in step 22 (optional), the format (c, u', v') of the output image $I_{12}$ may also be adapted to a specific output format before encoding. In step 25, the format of the decoded image $\hat{I}_2$ may be adapted to a specific format of the input of the post-processing stage 12, and in step 26, the image $I_3$ may be adapted to at least one characteristic of a targeted apparatus (e.g. a Set-Top-Box, a connected TV, HDR/SDR enabled CE device, a Blu-ray disc player) and/or an inverse gamut mapping may be used when the decoded image $\hat{I}_2$ and the image $I_3$ or the original image $I_1$ are represented in different color spaces and/or gamut.

Said format adaptation steps (21, 22, 25, 26) may include color space conversion and/or color gamut mapping. Usual format adapting processes may be used such as RGB-to-YUV or YUV-to-RGB conversion, BT.709-to-BT.2020 or BT.2020-to-BT.709, down-sampling or up-sampling chroma components, etc. Note that the well-known YUV color space refers also to the well-known YCbCr in the prior art. Annex E of the recommendation ETSI recommendation ETSI TS 103 433 V1.1.1, release 2016-8, provides an example of format adapting processes and inverse gamut mapping (Annex D).

Said input format adaptation step 21 may also include adapting the bit depth of the original image $I_1$ to specific bit depth such as 10 bits for example, by applying a transfer function on the original image $I_1$. For example, a PQ or HLG transfer function may be used (Rec. ITU-R BT.2100-0).

In more details, the pre-processing stage 20 comprises steps 200-202.

In step 200, a first component c1 of the output image $I_{12}$ is obtained by mapping a first component C1 of the original image $I_1$:

$$c_1 = TM(C1)$$

with TM being a mapping function. The mapping function TM may reduce or increase the dynamic range of the luminance of the original image $I_1$ and its inverse may increase or reduce the dynamic range of the luminance of an image.

In step 201, a second and third component u', v' of the output image $I_{12}$ are derived by correcting second and third components U', V' of the original image $I_1$ according to the first component $c_1$.

The correction of the chroma components may be maintained under control by tuning the parameters of the mapping. The color saturation and hue are thus under control.

According to an embodiment of step 201, the second and third components U' and V' are divided by a scaling function $\beta_0(c_1)$ whose value depends on the first component $c_1$.

Mathematically speaking, the second and third components u', v' are given by:

$$\begin{bmatrix} u' \\ v' \end{bmatrix} = \frac{1}{\beta_0(c_1)} \cdot \begin{bmatrix} U' \\ V' \end{bmatrix}$$

Optionally, in step 202, the first component $c_1$ may be adjusted to further control the perceived saturation, as follows:

$$c = c_1 - \max(0, a.u' + b.v')$$

where a and b are two parameters of the set of parameters SP.

This step 202 allows to control the luminance of the output image $I_{12}$ to guarantee the perceived color matching between the colors of the output image $I_{12}$ and the colors of the original image $I_1$.

The set of parameters SP may comprise parameters relative to the mapping function TM or its inverse ITM, the scaling function $\beta_0(c_1)$. These parameters are associated with dynamic metadata and carried in a bitstream, for example the bitstream B. The parameters a and b may also be carried in a bitstream.

In more details, at the post-processing part, in step 10, a set of parameters SP is obtained as explained in FIG. 1. According to an embodiment of step 10, the set of parameters SP is carried by static/dynamic metadata obtained from a specific channel or from a bitstream, including the bitstream B, possibly store on a storage medium.

In step 11, the module M1 obtains a decoded image $\hat{I}_2$ by decoding the bitstream B and the decoded image $\hat{I}_2$ is then available for either an SDR or HDR enabled CE display.

In more details, the post-processing stage 12 comprises steps 120-122.

In optional step 120, the first component c of the decoded image $\hat{I}_2$ may be adjusted as follows:

$$c_1 = c + \max(0, a.u' + b.v')$$

where a and b are two parameters of the set of parameters SP.

In step 121, the first component C1 of the image $I_3$ is obtained by inverse-mapping the first component $c_1$:

$$C_1 = ITM(c_1)$$

In step 122, the second and third component U', V' of the image $I_3$ are derived by inverse correcting the second and third components u', v' of the decoded image $\hat{I}_2$ according to the component $c_1$.

According to an embodiment, a second and third components u' and v' are multiplied by a scaling function $\beta_0(c_1)$ whose value depends on the first component $c_1$.

Mathematically speaking, the two first and second components U', V' are given by:

$$\begin{bmatrix} U' \\ V' \end{bmatrix} = \beta_0(c_1) \cdot \begin{bmatrix} u' \\ v' \end{bmatrix}$$

Figure 3:
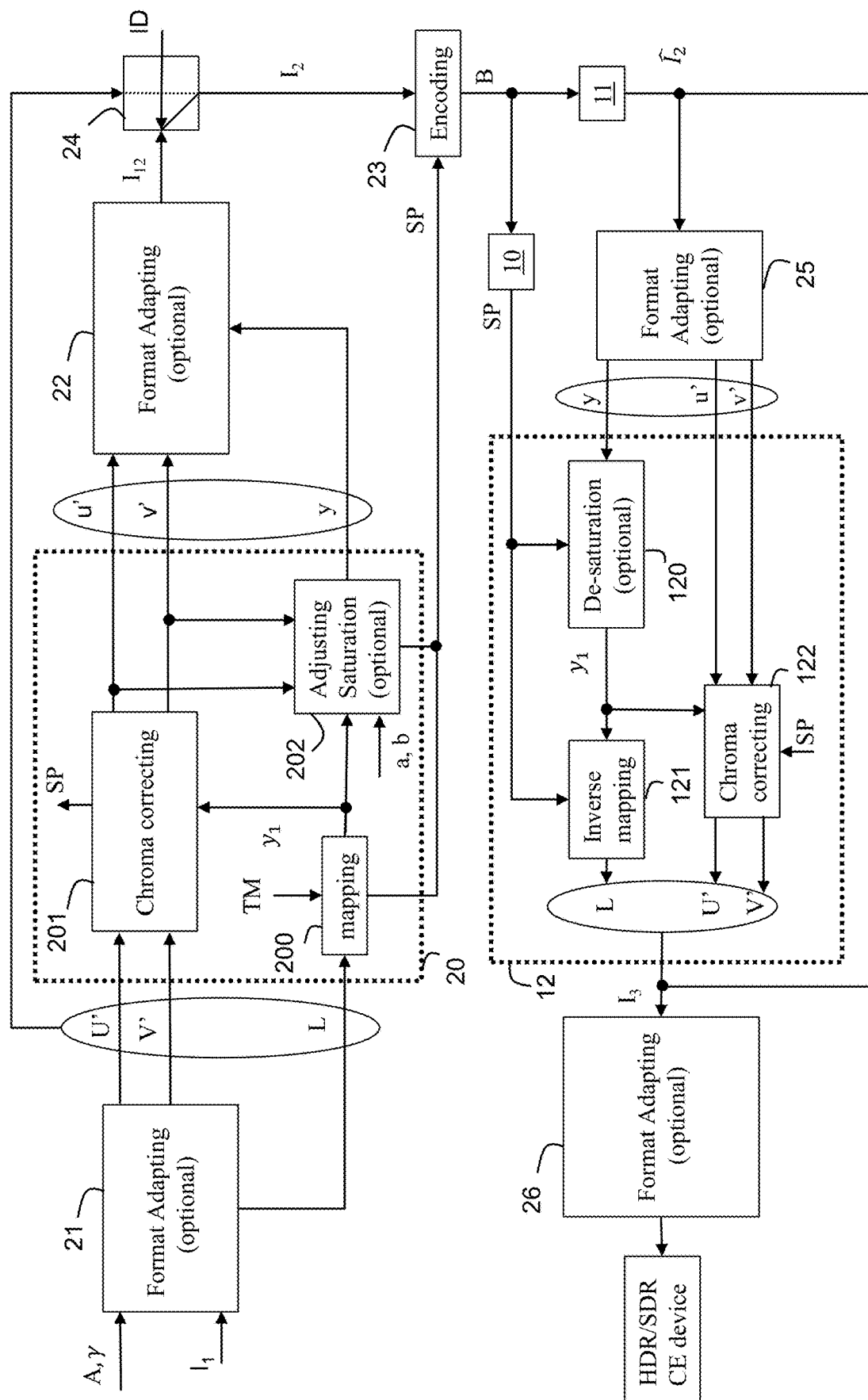
FIG. 3 shows a variant of the end-to-end workflow of FIG. 2 in accordance with an embodiment of the present principles.

According to a first embodiment of the method of FIG. 2, as illustrated in FIG. 3, at the pre-processing part, the first component C1 of the original image $I_1$ is a linear-light luminance component L obtained from the RGB component of the original image $I_1$ by:

$$C1 = L = A_1 \begin{bmatrix} R \\ G \\ B \end{bmatrix}$$

and the second and third component U', V' are derived by applying a pseudo-gammatization using square-root (close to BT.709 OETF) to the RGB components of the original image $I_1$:

$$\begin{bmatrix} U' \\ V' \end{bmatrix} = \begin{bmatrix} A_2 \\ A_3 \end{bmatrix} \begin{bmatrix} \sqrt{R} \\ \sqrt{G} \\ \sqrt{B} \end{bmatrix} \times 1024$$

In step 200, the first component $y_1$ of the output image $I_{12}$ is obtained by mapping said linear-light luminance component L:

$$y_1 = TM(L)$$

In step 201, the second and third component u', v' of the output image $I_{12}$ are derived by correcting the first and second components U', V' according to the first component $y_1$.

At the post-processing part, in step 121, a linear-light luminance component L of the image $I_3$ is obtained by inverse-mapping the first component $c_1$:

$$L = ITM(y_1)$$

In step 122, the second and third component U', V' of the image $I_3$ are derived by inverse correcting the second and third components u', v' of the output image $I_{12}$ according to the first component $y_1$.

According to an embodiment of step 122, the second and third components u' and v' are multiplied by a scaling function $\beta_0(y_1)$ whose value depends on the first component $y_1$.

Mathematically speaking, the two first and second components U', V' are given by:

$$\begin{bmatrix} U' \\ V' \end{bmatrix} = \beta_0(y_1) \cdot \begin{bmatrix} u' \\ v' \end{bmatrix}$$

Figure 4:
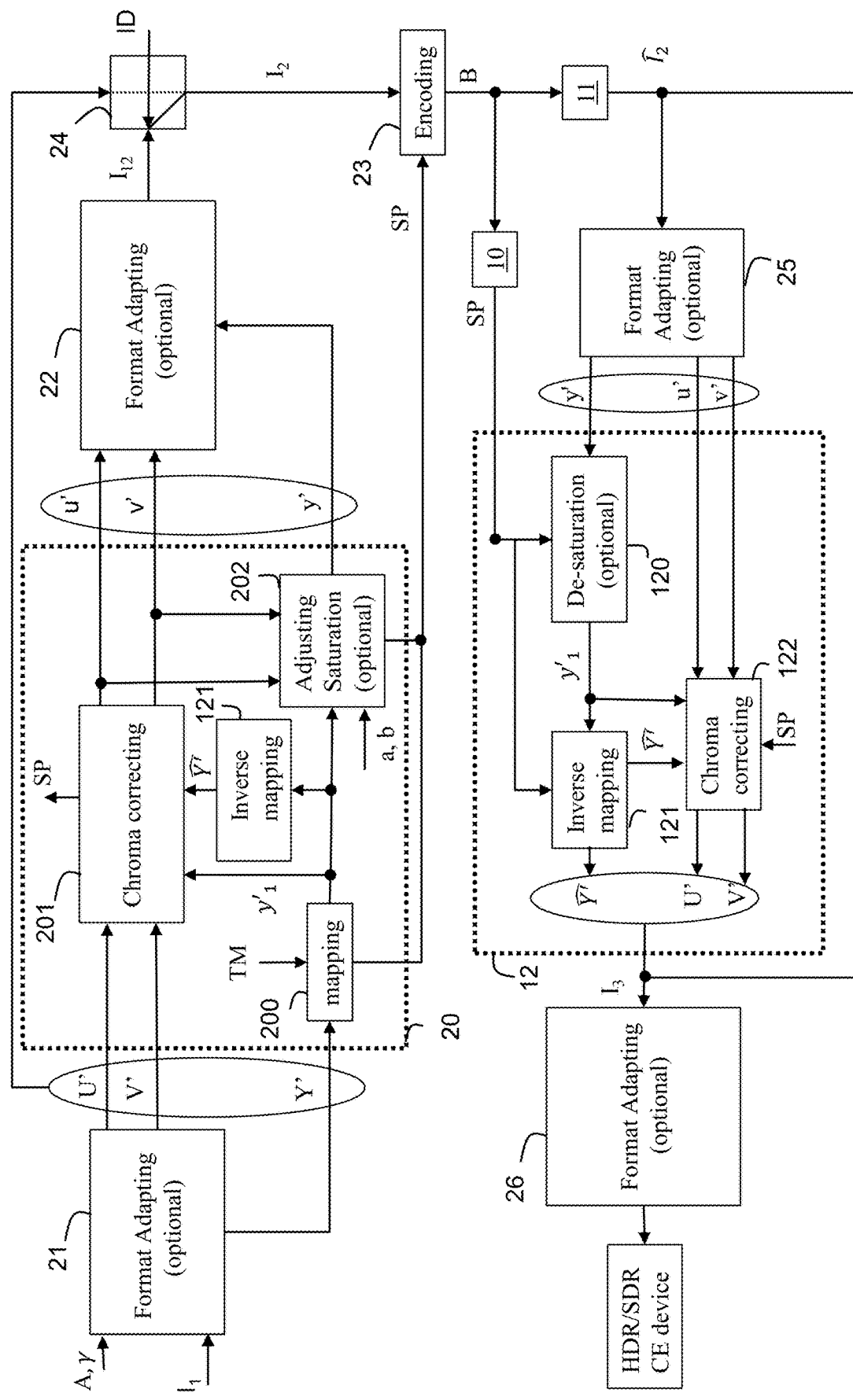
FIG. 4 shows a variant of the end-to-end workflow of FIG. 2 in accordance with another embodiment of the present principles.

According to a second embodiment of the method of FIG. 2, as illustrated in FIG. 4, at the pre-processing part, the first component C1 of the original image $I_1$ is a component Y' obtained from the gamma-compressed RGB components of the original image $I_1$ by:

$$Y' = A_1 \begin{bmatrix} R' \\ G' \\ B' \end{bmatrix}$$

and the second and third component U', V' by applying a gammatization to the RGB components of the original image $I_1$:

$$\begin{bmatrix} U' \\ V' \end{bmatrix} = \begin{bmatrix} A_2 \\ A_3 \end{bmatrix} \begin{bmatrix} R' \\ G' \\ B' \end{bmatrix} \times 1024$$

where γ may be a gamma factor, preferably equal to 2.4.

Note, the component Y', which is a non-linear signal, is different of the linear-light luminance component L.

In step 200, the first component $y'_1$ of the output image $I_{12}$ is obtained by mapping said component Y':

$$y'_1 = TM(Y')$$

In step 121, a reconstructed component $\widehat{Y'}$ is obtained by inverse-mapping the first component $y'_1$:

$$\widehat{Y'} = ITM(y'_1)$$

where ITM is the inverse of the mapping function TM.

The values of the reconstructed component $\widehat{Y'}$ belong thus to the dynamic range of the values of the component Y'.

In step 201, the second and third component u', v' of the output image $I_{12}$ are derived by correcting the first and second components U', V' according to the first component $y'_1$ and the reconstructed component $\widehat{Y'}$..

This step 201 allows to control the colors of the output image $I_{12}$ and guarantees their matching to the colors of the original image $I_1$.

The correction of the chroma components may be maintain under control by tuning the parameters of the mapping (inverse mapping). The color saturation and hue are thus under control. Such a control is not possible, usually, when a non-parametric perceptual transfer function is used.

According to an embodiment of step 201, the second and third components U' and V' are divided by a scaling function $\beta_0(y'_1)$ whose value depends on the ratio of the reconstructed component $\widehat{Y'}$ over the component $y'_1$:

$$\beta_0(y'_1) = \frac{ITM(y'_1) \cdot \Omega}{y'_1} = \frac{\widehat{Y'} \cdot \Omega}{y'_1}$$

with Ω is constant value depending on the color primaries of the original image $I_1$ (equals to 1.3 for BT.2020 for example).

At the post-processing part, in step 121, a component $\widehat{Y'}$ of the image $I_3$ is obtained by inverse-mapping the first component $y_1$:

$$\widehat{Y'} = ITM(y'_1)$$

In step 122, the second and third component U', V' of the image $I_3$ are derived by inverse correcting the second and third components u', v' of the decoded image $\widehat{I_2}$ according to the first component $y'_1$ and the component Y'.

According to an embodiment of step 122, a second and third components u' and v' are multiplied by the scaling function $\beta_0(y'_1)$.

Mathematically speaking, the two first and second components U', V' are given by:

$$\begin{bmatrix} U' \\ V' \end{bmatrix} = \beta_0(y'_1) \cdot \begin{bmatrix} u' \\ v' \end{bmatrix}$$

The mapping function TM is based on a perceptual transfer function, whose goal is to convert a component of an original image $I_1$ into a component of an output image $I_{12}$, thus reducing (or increasing) the dynamic range of the values of their luminance. The values of a component of an output image $I_{12}$ belong thus to a lower (or greater) dynamic range than the values of the component of an original image $I_1$.

Said perceptual transfer function uses a limited set of control parameters.

Figure 5A:
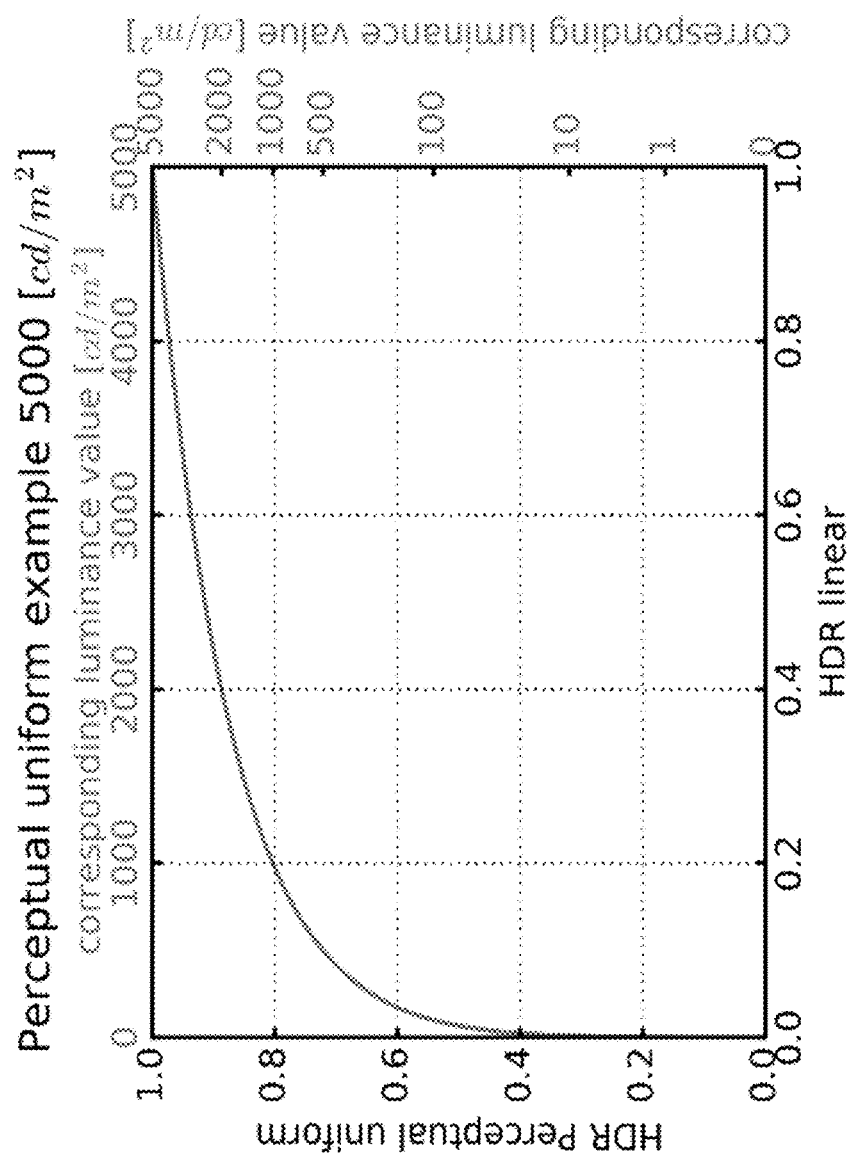
FIG. 5a shows an illustration of a perceptual transfer function.

FIG. 5*a* shows an illustration of a perceptual transfer function which may be used for mapping luminance components but a similar perceptual transfer function for mapping luma components may be used.

Figure 5B:
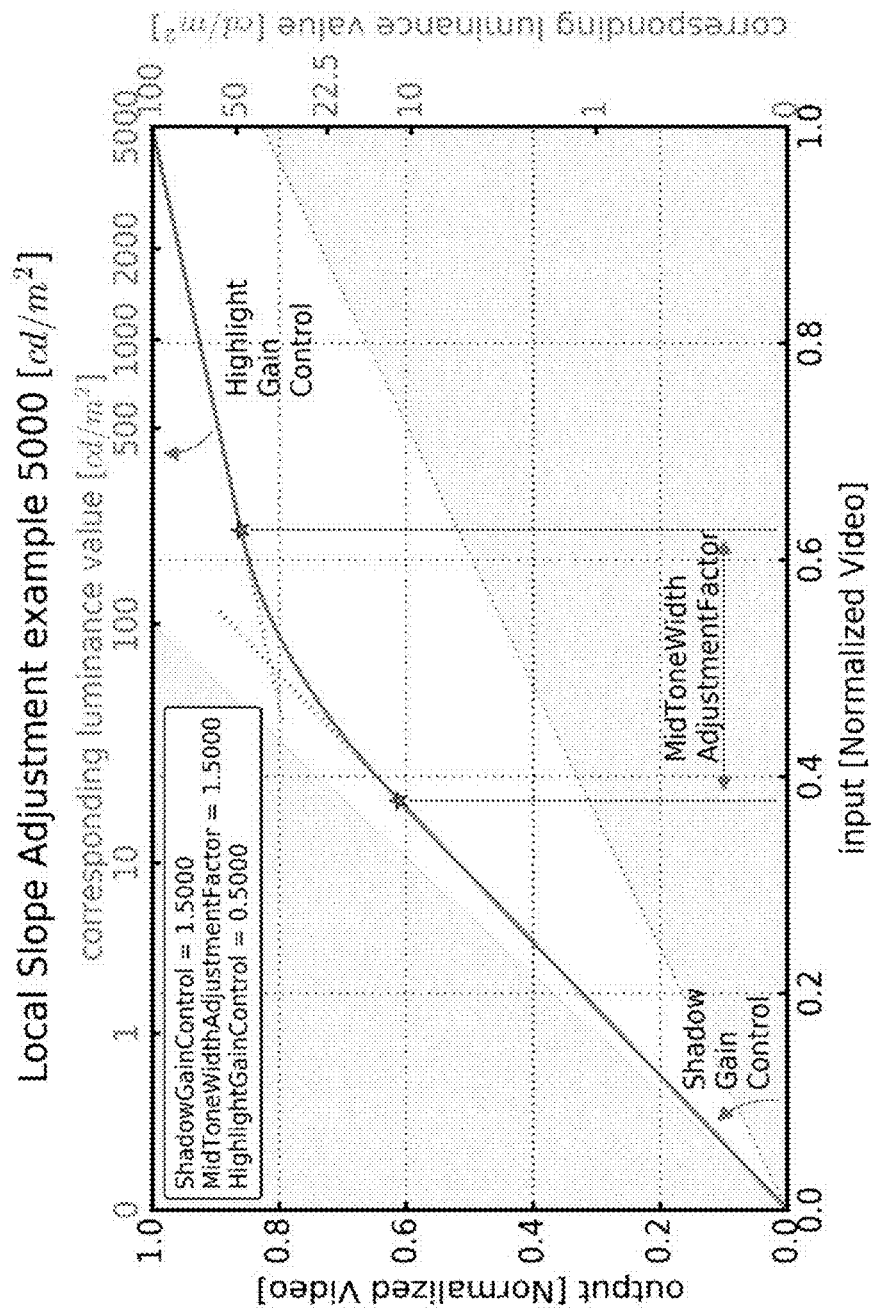
FIG. 5b shows an example of a piece-wise curve used for mapping.

The mapping is controlled by a mastering display peak luminance parameter (equal to 5000 cd/m² in FIG. 5*a*). To better control the black and white levels, a signal stretching between content-dependent black and white levels is applied. Then the converted signal is mapped using a piece-wise curve constructed out of three parts, as illustrated in FIG. 5*b*. The lower and upper sections are linear, the steepness being determined by the shadowGain and highlightGain parameters respectively. The mid-section is a parabola providing a smooth bridge between the two linear sections. The width of the cross-over is determined by the midToneWidthAdjFactor parameter.

All the parameters controlling the mapping may be conveyed as metadata for example by using a SEI message as defined in JCTVC-W0133 to carry the SMPTE ST 2094-20 metadata.

Figure 5C:
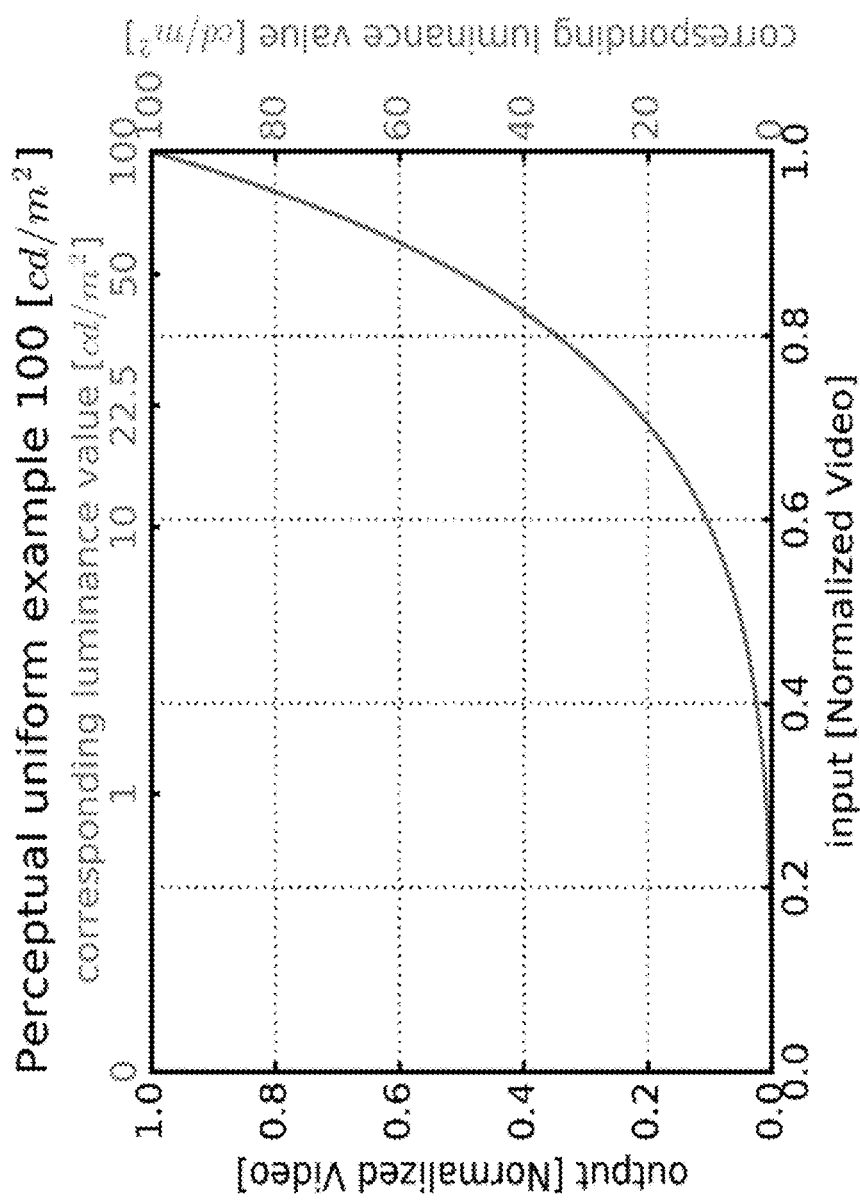
FIG. 5c shows an example of a curve used for converting back a signal to a linear light domain.

FIG. 5*c* shows an example of the inverse of the perceptual transfer function TM (FIG. 5*a*) to illustrate how a perceptual optimized video signal may be converted back to the linear light domain based on a targeted legacy display maximum luminance, for example 100 cd/m².

In step 10 (FIG. 1), the set of parameters SP is obtained to reconstruct an image $I_3$ from a decoded image $\hat{I}_2$..

These parameters may be obtained from metadata obtained from a bitstream, for example the bitstream B.

The recommendation ETSI TS 103 433 V1.1.1 clause 6, 2016-08 provides an example of syntax of said metadata.

The syntax of the recommendation ETSI TS 103 433 v1.1.1 is described for reconstructing an HDR video from an SDR video but this syntax may extend to the reconstruction of any image $I_3$ from any decoded image $\hat{I}_2$..

The post-processing (step 12) operates on an inverse mapping function ITM and a scaling function $\beta_0(.)$ that are derived from dynamic metadata because they depend on the first component $c_1$.

According to the recommendation ETSI TS 103 433 V1.1.1, said dynamic metadata may be conveyed according to either a so-called parameter-based mode or a table-based mode.

The parameter-based mode may be of interest for distribution workflows which primary goal is to provide direct SDR backward compatible services with very low additional payload or bandwidth usage for carrying the dynamic metadata. The table-based mode may be of interest for workflows equipped with low-end terminals or when a higher level of adaptation is required for representing properly both HDR and SDR streams.

In the parameter-based mode, dynamic metadata to be conveyed are luminance mapping parameters representative of the inverse function ITM, i.e.

tmInputSignalBlackLevelOffset;
tmInputSignalWhiteLevelOffset;
shadowGain;
highlightGain;
midToneWidthAdjFactor;
tmOutputFineTuning parameters;

Moreover, other dynamic metadata to be conveyed are color correction parameters (saturationGainNumVal, saturationGainX(i) and saturationGainY(i)) used to define the function $\beta_0(.)$ (ETSI recommendation ETSI TS 103 433 V1.1.1 clauses 6.3.5 and 6.3.6).

Note the parameters a and b may be respectively carried/hidden in the saturationGain function parameters as explained above.

These dynamic metadata may be conveyed using the HEVC Colour Volume Reconstruction Information (CVRI) user data registered SEI message whose syntax is based on the SMPTE ST 2094-20 specification (recommendation ETSI TS 103 433 V1.1.1 Annex A.3).

Typical dynamic metadata payload is about 25 bytes per scene.

In step 101, the CVRI SEI message is parsed the SEI message to obtain mapping parameters and color-correction parameters.

In step 12, the inverse mapping function ITM (so-called lutMapY) is reconstructed (derived) from the obtained mapping parameters (see recommendation ETSI TS 103 433 V1.1.1 clause 7.2.3.1 for more details).

In step 12, the scaling function $\beta_0(.)$ (so-called lutCC) is also reconstructed (derived) from the obtained color-correction parameters (see recommendation ETSI TS 103 433 V1.1.1 clause 7.2.3.2 for more details).

In the table-based mode, dynamic data to be conveyed are pivots points of a piece-wise linear curve representative of the inverse mapping function ITM. For example, the dynamic metadata are luminanceMappingNumVal that indicates the number of the pivot points, luminanceMappingX that indicates the x values of the pivot points, and luminanceMappingY that indicates the y values of the pivot points (see recommendation ETSI TS 103 433 V1.1.1 clauses 6.2.7 and 6.3.7 for more details).

Moreover, other dynamic metadata to be conveyed may be pivots points of a piece-wise linear curve representative of the scaling function $\beta_0(.)$ For example, the dynamic metadata are colorCorrectionNumVal that indicates the number of pivot points, colorCorrectionX that indicates the x values of pivot points, and colorCorrectionY that indicates the y values of the pivot points (see the recommendation ETSI TS 103 433 V1.1.1 clauses 6.2.8 and 6.3.8 for more details).

These dynamic metadata may be conveyed using the HEVC Colour Remapping Information (CRI) SEI message whose syntax is based on the SMPTE ST 2094-30 specification (recommendation ETSI TS 103 433 V1.1.1 Annex A.4).

Typical payload is about 160 bytes per scene.

In step 102, the CRI (Colour Remapping Information) SEI message (as specified in HEVC/H.265 version published in December 2016) is parsed to obtain the pivot points of a piece-wise linear curve representative of the inverse mapping function ITM and the pivot points of a piece-wise linear curve representative of the scaling function $\beta_0(.)$, and the chroma to luma injection parameters a and b.

In step 12, the inverse mapping function ITM is derived from those of pivot points relative to a piece-wise linear curve representative of the inverse mapping function ITM (see recommendation ETSI TS 103 433 V1.1.1 clause 7.2.3.3 for more details).

In step 12, the scaling function $\beta_0(.)$, is also derived from those of said pivot points relative to a piece-wise linear curve representative of the scaling function $\beta_0(.)$, (see recommendation ETSI TS 103 433 V1.1.1 clause 7.2.3.4 for more details).

Note that static metadata also used by the post-processing stage may be conveyed by SEI message. For example, the selection of either the parameter-based mode or table-based mode may be carried by the Information (TSI) user data registered SEI message (payloadMode) as defined by the recommendation ETSI TS 103 433 V1.1.1 (clause A.2.2). Static metadata such as, for example, the color primaries or the maximum display mastering display luminance are conveyed by a Mastering Display Colour Volume (MDCV) SEI message as defined in AVC, HEVC.

According to an embodiment of step 103, the information data ID is explicitly signaled by a syntax element in a bitstream and thus obtained by parsing the bitstream.

For example, said syntax element is a part of an SEI message.

According to an embodiment, said information data ID identifies what is the processing applied to the original image $I_1$ to process the set of parameters SP.

According to this embodiment, the information data ID may then be used to deduce how to use the parameters to reconstruct the image $I_3$ (step 12).

For example, when equal to 1, the information data ID indicates that the parameters SP have been obtained by applying the pre-processing stage (step 20) to an original HDR image $I_1$ and that the decoded image $\hat{I}_2$ is a SDR image.

When equal to 2, the information data ID indicates that the parameters have been obtained by applying the pre-processing stage (step 20) to an HDR10bits image (input of step 20), that the decoded image $\hat{I}_2$ is a HDR10 image, and the mapping function TM is a PQ transfer function.

When equal to 3, the information data ID indicates that the parameters have been obtained by applying the pre-processing stage (step 20) to a HDR10 image (input of step 20), that the decoded image $\hat{I}_2$ is an HLG10 image, and the mapping function TM is a HLG transfer function to the original image $I_1$.

According to an embodiment of step 103, the information data ID is implicitly signaled.

For example, the syntax element transfer-characteristics present in the VUI of HEVC (annex E) or AVC (annex E) usually identifies a transfer function (mapping function TM) to be used. Because different single layer distribution solutions use different transfer function (PQ, HLG, . . . ), the syntax element transfer-characteristics may be used to identify implicitly the recovery mode to be used.

The information data ID may also be implicitly signaled by a service defined at a higher transport or system layer.

In accordance with another example, a peak luminance value and the color space of the image $I_3$ may be obtained by parsing the MDCV SEI message carried by the bitstream, and the information data ID may be deduced from specific combinations of peak luminance values and color spaces (color primaries).

According to an embodiment of step 102, a parameter P is considered as being lost when it is not present in (not retrieved from) the bitstream.

For example, when the parameters P are carried by SEI message such as the CVRI or CRI SEI messages as described above, a parameter P is considered as being lost (not present) when the SEI message is not transmitted in the bitstream or when the parsing of the SEI message fails.

According to an embodiment of step 103, a parameter P is considered as being corrupted when at least one of the following conditions is fulfilled:

its value is out of a determined range of values (e.g. saturation_gain_num_val equal to 10 when the compliant range is 0 to 6);

said parameter does not have a coherent value according to other parameter values (e.g. saturation_gain_y[i] contains an outlier i.e. a value that is far from other saturation_gain_y [i] values; typically saturation_gain[0] until saturation_gain [4] are equal to value in the range of 0 to 16 and saturation_gain[1]=255).

According to an embodiment of the method, a recovery mode $RM_i$ is to replace all the parameters P by recovered parameters $P_r$, even if only some of the parameters P are not corrupted, lost or not aligned with the decoded image $\hat{I}_2$ whose graphics or overlay is added to.

According to an embodiment of the method, another recovery mode $RM_i$ is to replace each lost, corrupted or not aligned parameter P by a recovered parameter $P_r$.

According to an embodiment of the method, a recovery mode $RM_i$ is to replace a lost, corrupted or not aligned parameter P by a value of a set of pre-determined parameter values previously stored.

For example, a set of pre-determined parameter values may gather a pre-determined value for at least one metadata carried by the CRI and/or CVRI SEI message.

A specific set of pre-determined parameter values may be determined, for example, for each single layer based distribution solution identified by the information data ID.

Table 1 is a non-limitative example of specific set of predetermined values for 3 different single layer based distribution solutions.

TABLE 1

| Information data ID | ETSI TS 103 433 parameters |
|---|---|
| 0 | Shadow gain: 1.16 |
|   | Highlight gain: 2.0 |
|   | MidTones Adjustment: 1.5 |
|   | White stretch: 0 |
|   | Black stretch: 0 |
|   | Saturation Gain [ ]: {(0.64); (24.64); (62.59); (140.61); (252.64); (255.64)} |
| 1 | Shadow gain: 1.033 |
|   | Highlight gain: 2.0 |
|   | MidTones Adjustment: 1.5 |
|   | White stretch: 0 |
|   | Black stretch: 0 |
| 2 | Shadow gain: 1.115 |
|   | Highlight gain: 2.0 |
|   | MidTones Adjustment: 1.5 |
|   | White stretch: 0 |

According to the Table 1, three different sets of predetermined values are defined according to the information data ID. These sets of predetermined values defined recovered values for some parameters used by the post-processing stage. The other parameters being set to fixed values that are common to the different single layer solutions.

According to an embodiment of step 104, a recovery mode RMi is selected according to either at least one characteristic of the original video (image $I_1$), typically the peak luminance of the original content, or of a mastering display used to grade the input image data or the image data to be reconstructed, or at least one characteristic of another video, typically the peak luminance of the reconstructed image $I_3$, or of a target display.

According to an embodiment, a recovery mode $RM_i$ is to check if a characteristic of the original video ($I_1$) or of a mastering display used to grade the input image data or the image data to be reconstructed (e.g. a characteristic as defined in ST 2086) is present and to compute at least one recovered parameter from said characteristic. If said characteristic of the input video is not present and a characteristic of a mastering display is not present, one checks if a characteristic of the reconstructed image $I_3$ or of the target display is present (e.g. the peak luminance as defined in CTA-861.3) and computes at least one recovered parameter from said characteristic. If said characteristic of the reconstructed image $I_3$ is not present and said characteristic of the target display is not present, at least one recovered parameter is a fixed value (e.g. fixed by a video standardization committee or an industry forum such as, for example 1000 cd/m2).

In accordance with a non-limitative example, Table 2 provides examples of recovery values for some parameters used by the post-processing stage that depends on the presence of available information on the input/output content and mastering/target displays.

TABLE 2

| Syntax element | Recovery value |
|---|---|
| matrix_coefficient_value[i] | {889; 470; 366; 994}, if BT.2020 |
|   | {915; 464; 392; 987 BT.709 |

TABLE 2-continued

| Syntax element | Recovery value |
| --- | --- |
| shadow_gain_control | if MDCV SEI message is present, recovery mode 1 otherwise recovery mode 2 |

The parameters matrix_coefficient_value[i] may be set according to the input/output video color space, BT.709 or BT.2020 (characteristic of the input or output video) obtained by parsing a MDCV SEI/ST 2086 message if present. The recovery mode depends on said color spaces.

The parameter shadow_gain_control may be computed according to a value obtained by parsing a MDCV SEI/ST 2086 message if present.

For example, an information representative of the peak luminance of a mastering display is obtained from said MDCV SEI/ST 2086 message and the parameter shadow gain control is computed by (recovery mode 1): shadow_gain_control=Clip(0; 255; Floor(rs(hdrDisplay-MaxLuminance)×127.5+0.5))
with $$r_s(x) = \frac{7.5}{\ln\left(1+4.7\times\left(\frac{x}{100}\right)^{1/2.4}\right)} - 2 \text{ and } \text{Clip3}(x; y; z)\begin{cases} x, z<x \\ y, z>y \\ z \text{ otherwise} \end{cases}$$

It is likely that at a service level information or for a specific workflow the value of hdrDisplayMaxLuminance is known. This value may also be set to the peak luminance of a target (presentation) display when this characteristic is available. Otherwise (recovery mode 2), it is arbitrarily set to a default value, typically 1000 cd/m2. This default value corresponds to a currently observed reference maximum display mastering luminance in most of the current HDR markets.

Figure 6:
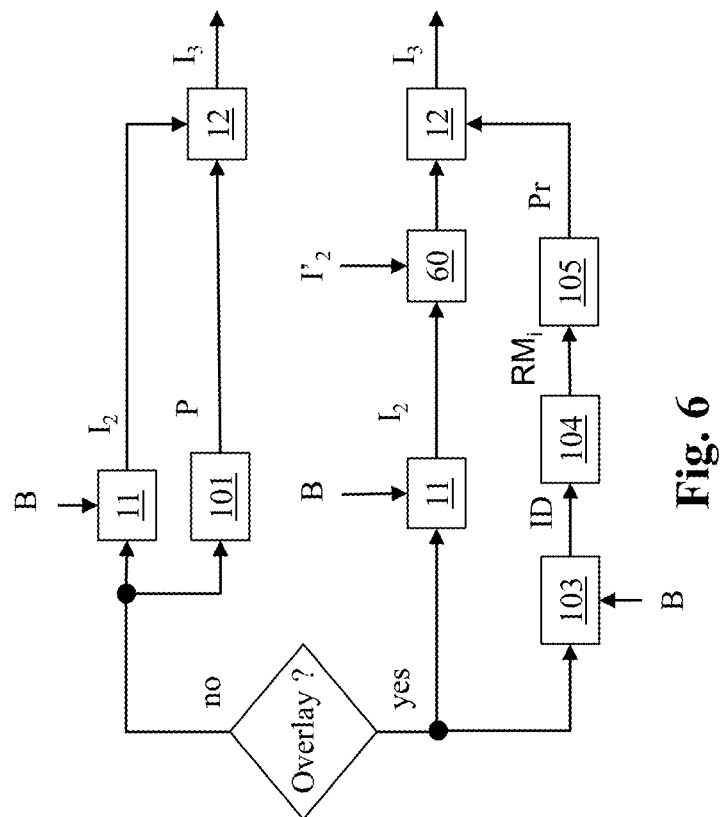
FIG. 6 shows another example of the use of a method for reconstructing an image from a decoded image data and parameters obtained from a bitstream in accordance with an example of the present principles.

FIG. 6 shows another example of the use of a method for reconstructing an image $I_3$ from a decoded image data $\hat{I}_2$ and a set of parameters SP obtained from a bitstream B in accordance with an example of the present principles.

Said example is intended to be implemented, at least partially, in any (mid-)device implementing an overlay inserting and mixing mechanism (e.g. Set-Top-Box or UltraHD Blu-ray player) and signaling/sending an event (typically an overlay_present_flag set to 1) to a decision module that an overlay has to be added to the decoded image $\hat{I}_2$..

When an overlay (graphics) has not to be added to a decoded image $\hat{I}_2$, the set of parameters SP is obtained (step 10), the decoded image $\hat{I}_2$ obtained (step 11) and the image $I_3$ is reconstructed (step 12) as described in FIG. 1.

When an overlay has to be added to a decoded image $\hat{I}_2$,, the decoded image $\hat{I}_2$, is obtained (step 11) and, in step 60, a composite image $I'_2$ is obtained by adding graphics (overlay) to the decoded image $\hat{I}_2$,.

The information data ID is then obtained (step 103), a recovery mode selected (step 104) and the selected recovery mode $RM_i$ applies (step 105) to obtain recovered parameters $P_r$.

The image $I_3$ is then reconstructed (step 12) from the recovered parameters $P_r$ and the decoded image $\hat{I}_2$,.

According to an embodiment, the parameters $P_r$ are obtained by training a large set of images of different aspects (bright, dark, with logos . . . )

Optionally (not shown in FIG. 6), the step 12 may be implemented in a remote device such a TV set. In that case, either the decoded image $\hat{I}_2$, plus the parameters P or the composite image $I'_2$ plus the parameters $P_r$ are transmitted to said TV set.

On FIG. 1-6, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the present principles are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 7:
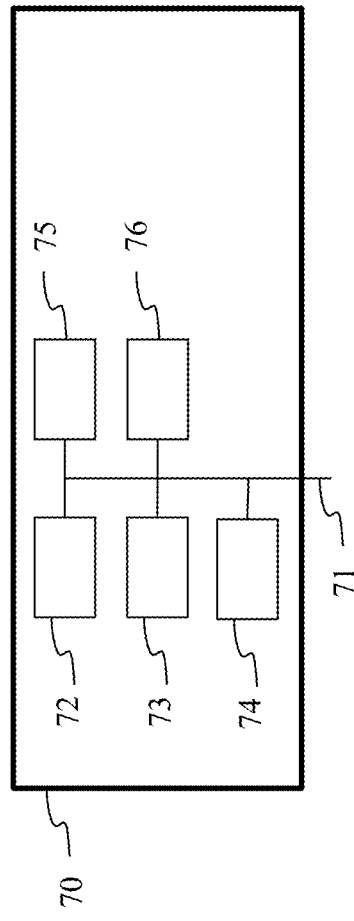
FIG. 7 shows an example of an architecture of a device in accordance with an example of present principles.

FIG. 7 represents an exemplary architecture of a device 70 which may be configured to implement a method described in relation with FIG. 1-6.

Device 70 comprises following elements that are linked together by a data and address bus 71:
- a microprocessor 72 (or CPU), which is, for example, a DSP (or Digital Signal Processor);
- a ROM (or Read Only Memory) 73;
- a RAM (or Random Access Memory) 74;
- an I/O interface 75 for reception of data to transmit, from an application; and
- a battery 76

In accordance with an example, the battery 76 is external to the device. In each of mentioned memory, the word «register» used in the specification can correspond to area of small capacity (some bits) or to very large area (e.g. a whole program or large amount of received or decoded data). The ROM 73 comprises at least a program and parameters. The ROM 73 may store algorithms and instructions to perform techniques in accordance with present principles. When switched on, the CPU 72 uploads the program in the RAM and executes the corresponding instructions.

RAM 64 comprises, in a register, the program executed by the CPU 72 and uploaded after switch on of the device 70, input data in a register, intermediate data in different states of the method in a register, and other variables used for the execution of the method in a register.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users. In accordance with an example, the input video or an original image of an input video is obtained from a source. For example, the source belongs to a set comprising:

- a local memory (73 or 74), e.g. a video memory or a RAM (or Random Access Memory), a flash memory, a ROM (or Read Only Memory), a hard disk;
- a storage interface (75), e.g. an interface with a mass storage, a RAM, a flash memory, a ROM, an optical disc or a magnetic support;
- a communication interface (75), e.g. a wireline interface (for example a bus interface, a wide area network interface, a local area network interface) or a wireless interface (such as a IEEE 802.11 interface or a Bluetooth® interface); and
- an image capturing circuit (e.g. a sensor such as, for example, a CCD (or Charge-Coupled Device) or CMOS (or Complementary Metal-Oxide-Semiconductor)).

In accordance with examples, the bitstreams carrying on the metadata are sent to a destination. As an example, one of these bitstream or both are stored in a local or remote memory, e.g. a video memory (74) or a RAM (74), a hard disk (73). In a variant, at least one of the bitstreams is sent to a storage interface (75), e.g. an interface with a mass storage, a flash memory, ROM, an optical disc or a magnetic support and/or transmitted over a communication interface (75), e.g. an interface to a point to point link, a communication bus, a point to multipoint link or a broadcast network.

In accordance with other examples, the bitstream carrying on the metadata is obtained from a source. Exemplarily, the bitstream is read from a local memory, e.g. a video memory (74), a RAM (74), a ROM (73), a flash memory (73) or a hard disk (73). In a variant, the bitstream is received from a storage interface (75), e.g. an interface with a mass storage, a RAM, a ROM, a flash memory, an optical disc or a magnetic support and/or received from a communication interface (75), e.g. an interface to a point to point link, a bus, a point to multipoint link or a broadcast network.

In accordance with examples, device 70 being configured to implement the method as described above, belongs to a set comprising:

- a mobile device;
- a communication device;
- a game device;
- a tablet (or tablet computer);
- a laptop;
- a still image camera;
- a video camera;
- an encoding/decoding chip;
- TV set;
- a set-top-box;
- a display;
- a still image server; and
- a video server (e.g. a broadcast server, a video-on-demand server or a web server).

Implementations of the various processes and features described herein may be embodied in a variety of different equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and any other device for processing a image or a video or other communication devices. As should be clear, the equipment may be mobile and even installed in a mobile vehicle.

Additionally, the methods may be implemented by instructions being performed by a processor, and such instructions (and/or data values produced by an implementation) may be stored on a computer readable storage medium. A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

The instructions may form an application program tangibly embodied on a processor-readable medium.

Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described example of the present principles, or to carry as data the actual syntax-values written by a described example of the present principles. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same

The invention claimed is:

1. A method for reconstructing image data representative of original image data from decoded image data and parameters obtained from a bitstream, the parameters having been processed from the original image data, wherein the method comprises:
in response to a determination that a graphic is to be overlaid on a decoded image:
selecting a recovery mode according to information data indicating how the parameters have been processed;
recovering the parameters by applying the selected recovery mode; and
reconstructing image data based on the decoded image data and the recovered parameters, comprising at least inverse mapping of luminance of the decoded image data and chroma correcting of the decoded image data;
wherein the decoded image data and the reconstructed image data have different dynamic ranges.

2. A device for reconstructing image data representative of original image data from decoded image data and parameters obtained from a bitstream, the parameters having been processed from the original image data, wherein the decoded image data and the reconstructed image data have different dynamic ranges and wherein the device comprises:
at least one processor; and
at least one memory having stored instructions operative, when executed by the at least one processor, to cause the device to, in response to a determination that a graphic is to be overlaid on a decoded image:
select a recovery mode according to an information data indicating how the parameters have been processed;
recover the parameters by applying the selected recovery mode; and
reconstruct image data based on the decoded image data and the recovered parameters, comprising at least inverse mapping of luminance of the decoded image data and chroma correcting of the decoded image data;
wherein the decoded image data and the reconstructed image data have different dynamic ranges.

3. The method of claim 1, wherein the information data is explicitly signaled by a syntax element in a bitstream.

4. The method of claim 1, wherein the information data is implicitly signaled.

5. The method of claim 1, wherein the information data identifies the processing that is applied to the original image data to process the parameters.

6. The method of claim 1, wherein selecting the recovery mode comprises selecting a recovery mode based on at least one characteristic of the original image data or of a mastering display used to grade the original image data, or at least one characteristic of the reconstructed image data or of a target display.

7. A non-transitory computer-readable storage medium having stored instructions that, when executed by a processor, cause the processor to reconstruct image data representative of original image data from decoded image data and parameters obtained from a bitstream, the parameters having been processed from the original image data, by:
in response to a determination that a graphic is to be overlaid on a decoded image:
selecting a recovery mode according to information data indicating how the parameters have been processed;
recovering the parameters by applying the selected recovery mode; and
reconstructing image data based on the decoded image data and the recovered parameters, comprising at least inverse mapping of luminance of the decoded image data and chroma correcting of the decoded image data;
wherein the decoded image data and the reconstructed image data have different dynamic ranges.

8. The device of claim 2, wherein the information data is explicitly signaled by a syntax element in a bitstream.

9. The device of claim 2, wherein the information data is implicitly signaled.

10. The device of claim 2, wherein the information data identifies the processing that is applied to the original image data to process the parameters.

11. The device of claim 2, wherein selecting the recovery mode comprises selecting a recovery mode based on at least one characteristic of the original image data or of a mastering display used to grade the original image data, or at least one characteristic of the reconstructed image data or of a target display.

* * * * *